United States Patent [19]

Beltran et al.

[11] Patent Number: 5,066,459
[45] Date of Patent: Nov. 19, 1991

[54] ADVANCED HIGH-TEMPERATURE BRAZING ALLOYS

[75] Inventors: Adrian M. Beltran, Ballston Spa; Charles H. Kreischer, Schenectady, both of N.Y.

[73] Assignee: General Electric Company, Schenectady, N.Y.

[21] Appl. No.: 524,982

[22] Filed: May 18, 1990

[51] Int. Cl.$^5$ .............................................. C22C 30/00
[52] U.S. Cl. ................................... 420/58.8; 420/436
[58] Field of Search ................ 420/436, 439, 588, 580

[56] References Cited

U.S. PATENT DOCUMENTS

| | | | |
|---|---|---|---|
| 1,449,338 | 3/1923 | McCordy | 420/588 |
| 2,763,547 | 3/1956 | Dyrkacz et al. | 75/171 |
| 3,260,505 | 7/1966 | Ver Snyder | 253/77 |
| 3,366,478 | 1/1968 | Wheaton | 75/171 |
| 3,837,838 | 9/1974 | Mohammed | 75/134 |
| 4,124,737 | 11/1978 | Wolfla | 428/640 |
| 4,381,944 | 5/1983 | Smith, Jr. et al. | 75/255 |
| 4,478,638 | 10/1984 | Smith, Jr. et al. | 75/255 |
| 4,618,474 | 10/1986 | Ohe et al. | 420/436 |
| 4,830,934 | 5/1989 | Ferrigno et al. | 428/678 |

FOREIGN PATENT DOCUMENTS

| | | | |
|---|---|---|---|
| 60-52545 | 3/1985 | Japan | 420/436 |
| 61-547 | 1/1986 | Japan | 420/436 |

*Primary Examiner*—Deborah Yee
*Attorney, Agent, or Firm*—Nixon & Vanderhye

[57] ABSTRACT

A cobalt base, high temperature brazing alloy having a composition, by weight of:

| | |
|---|---|
| Nickel | from about 8.5% to about 12.5% |
| Chromium | from about 24% to about 40% |
| Tungsten | from about 0% to about 9% |
| Carbon | from about 0.03% to about 0.6% |
| Boron | from about 0.01% to about 3.5% |
| Silicon | from about 0.1% to about 11% |
| Manganese | up to about 2% |
| Hafnium | from about 0.1% to about 3% |
| Tantalum | from about 0.1% to about 8% |
| Zirconium | from about 0% to about 1% |
| Titanium | from 0% to about 1% |
| Cobalt | Balance | is provided for use in the repair of Co-base turbine component superalloys.

2 Claims, No Drawings

ADVANCED HIGH-TEMPERATURE BRAZING ALLOYS

BACKGROUND AND SUMMARY OF THE INVENTION

This invention relates to the repair of alloy articles, and more particularly, to brazing alloy compositions used in an activated diffusion healing process utilized to repair gas turbine nozzles with service-induced damage.

There are numerous cobalt based alloys used in both the manufacture and repair of high-temperature operating gas turbine engine components including combustors, turbine vanes, nozzles, etc.

Representative examples of cobalt base alloys for the production and/or repair of superalloy articles are disclosed in U.S. Patent Nos. 4,830,934; 4,614,296; 4,381,944; 4,285,459; 4,058,415; 3,355,287; 3,276,865; 3,271,140; and 4,396,577.

During operation of such components under high-temperature operating conditions, various types of damage or deterioration can occur. For example, cracks can result from thermal cycling, foreign object impact, and/or corrosion. It is, of course, well known that the cost of these components is relatively high and therefore, it is more desirable to repair such components than to replace them.

The present invention relates to an improved brazing alloy composition for the repair of environmentally-damaged gas turbine parts exposed for long periods of time to corrosive high-temperature operation. These brazing alloy compositions are specifically adapted for use in an activated diffusion healing process to rebuild, for example, nozzles, by brazing a mixture of the brazing alloy and the base metal of the nozzle in particulate form. Specifically, repair is affected by brazing a deposit containing a mixture of braze alloy and parent alloy powders. The vacuum brazing cycle causes the braze alloy to melt and alloy with the parent alloy powder and the parent substrate surface. A post-braze diffusion heat treatment cycle is then applied to promote further interdiffusion. The mechanical properties of the resultant repaired region nearly approach those of the parent alloy.

The brazing alloys in accordance with this invention are cobalt-base alloys with a high chrome content and also containing B and Si as melting point depressants. The latter are necessary to allow the brazing alloy to melt without also melting the parent alloy component.

The cobalt base alloys of this invention also emphasize the major MC-forming elements Ta and Hf.

Accordingly, in one preferred embodiment of this invention, a brazing alloy is provided which comprises, by weight:

| Nickel | from about 8.5% to about 12.5% |
| Chromium | from about 24% to about 40% |
| Tungsten | from about 0% to about 9% |
| Carbon | from about 0.03% to about 0.6% |
| Boron | from about 0.01% to about 3.5% |
| Silicon | from about 0.1% to about 11% |
| Manganese | up to about 2% |
| Hafnium | from about 0.1% to about 3% |
| Tantalum | from about 0.1% to about 8% |
| Zirconium | from about 0% to about 1% |
| Titanium | from 0% to about 1% |
| Cobalt | Balance |

The alloys of this invention are high temperature (1200°–1900° F.) resistant and provide superior mechanical properties as well as oxidation and corrosion resistance in the above temperature range.

Other objects and advantages of the invention will become apparent from the detailed description which follows.

DETAILED DESCRIPTION OF THE INVENTION

The brazing alloys of this invention are adapted specifically for use with a known Co-base superalloy turbine nozzle having the following composition, by weight:

| Ni | 10% |
| Cr | 29% |
| W | 7% |
| C | 0.35% |
| B | 0.015% |
| Si | 0.1% |
| Mn | 0.1% |
| Hf | 1% |
| Ta | 0.5% |
| Zr | 0.5% |
| Ti | 0.2% |
| Co | Balance |

The alloys of this invention are also formulated to be compatible with another advanced Co-base superalloy substrate material, comprising, by weight:

| Ni | 10% |
| Cr | 29% |
| W | 7% |
| C | 0.25% |
| Si | 0.9% |
| Mn | 0.6% |
| Co | Balance |

The principal objective in either case is to retain the mechanical and environmental resistance properties of the above "parent" alloys, while lowering the melting temperature of the brazing allow (but not the parent alloy) for good brazing characteristics.

The present invention is embodied in Co-base alloys having the following composition range, by weight:

| Nickel | from about 8.5% to about 12.5% |
| Chromium | from about 24% to about 40% |
| Tungsten | from about 0% to about 9% |
| Carbon | from about 0.03% to about 0.6% |
| Boron | from about 0.01% to about 3.5% |
| Silicon | from about 0.1% to about 11% |
| Manganese | up to about 2% |
| Hafnium | from about 0.1% to about 3% |
| Tantalum | from about 0.1% to about 8% |
| Zirconium | from about 0% to about 1% |
| Titanium | from 0% to about 1% |
| Cobalt | Balance |

A first exemplary alloy in accordance with the present invention has the following composition:

| Nickel | 10% |
| Chromium | 29% |
| Tungsten | 7% |
| Carbon | 0.1% |
| Boron | 2.5% |
| Silicon | 2.5% |
| Manganese | 0.6% |

-continued

|  |  |
|---|---|
| Hafnium | 2% |
| Tantalum | 2% |
| Zirconium | 0% |
| Titanium | 0% |
| Cobalt | Balance |

A secondary exemplary alloy in accordance with the present invention has the following composition:

|  |  |
|---|---|
| Nickel | 10% |
| Chromium | 29% |
| Tungsten | 3.5% |
| Carbon | 0.1% |
| Boron | 1% |
| Silicon | 7% |
| Manganese | 0.6% |
| Hafnium | 0.1% |
| Tantalum | 4% |
| Zirconium | 0% |
| Titanium | 0% |
| Cobalt | Balance |

As noted hereinabove, the alloys of this invention have been formulated with Boron and Silicon as melting point depressants. This is necessary to insure that, during brazing, the brazing alloy mixture will melt but not the parent alloy. While Boron is advantageous in this respect, it is detrimental to good oxidation resistance. The alloys of this invention, therefore, also incorporate the major MC-forming elements Tantalum and Hafnium to provide increased oxidation resistance. Since these refractory elements (also including Zr and Ti) are also known to be the most thermodynamically stable boride formers, refractory borides of the $MB_2$ or MB types should form in the braze region as discrete particles. Although this may inhibit the migration of Boron away from the braze region, it will minimize the occurrence of script- or eutectic-like boride structures which will impair strength and ductility.

In use, a mixture of a brazing alloy of this invention and parent alloy powders are vacuum brazed in situ to rebuild turbine nozzles (or other components) with service induced damage. The vacuum brazing causes the braze alloy to melt with the parent alloy powder and parent substrate surface. A conventional post-braze diffusion heat treatment cycle is then applied to promote further interdiffusion as well as the migration of Boron away from the braze region. The effect of Boron on surface corrosion resistance is thus minimized.

The mechanical properties of the repaired region, using the alloys of this invention, approximate those of the parent alloy.

Thus, the brazing alloys of this invention provide superior oxidation and corrosion resistance, and superior mechanical properties over the temperature range of about 1200° to 1900° F., so that the repaired region of the turbine nozzle (or other component) has mechanical properties similar to those of the parent alloy.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A cobalt base, high temperature brazing alloy consisting essentially of, by weight:

|  |  |
|---|---|
| Nickel | 10%; |
| Chromium | 29%; |
| Tungsten | 7%; |
| Carbon | 0.1%; |
| Boron | 2.5%; |
| Silicon | 2.5%; |
| Manganese | 0.6%; |
| Hafnium | 2%; |
| Tantalum | 2%; and |
| Cobalt | Balance |

2. A cobalt base, high temperature brazing alloy consisting essentially of, by weight:

|  |  |
|---|---|
| Nickel | 10%; |
| Chromium | 29%; |
| Tungsten | 3.5%; |
| Carbon | 0.1%; |
| Boron | 1%; |
| Silicon | 7%; |
| Manganese | 0.6%; |
| Hafnium | 0.1%; |
| Tantalum | 4%; and |
| Cobalt | Balance |

* * * * *